US010980088B2

(12) United States Patent
Leindecker et al.

(10) Patent No.: US 10,980,088 B2
(45) Date of Patent: Apr. 13, 2021

(54) ENERGY ABSORPTION MONITORING FOR AN INTELLIGENT ELECTRONIC OVEN WITH ENERGY STEERING

(71) Applicant: Markov LLC, Los Altos, CA (US)

(72) Inventors: Nick C. Leindecker, Portola Valley, CA (US); Leonard Robert Speiser, Los Altos, CA (US); Arvind Antonio de Menezes Pereira, Milpitas, CA (US); Parth Chadha, Mountain View, CA (US)

(73) Assignee: Markov LLC, Los Altos, CA (US)

( * ) Notice: Subject to any disclaimer, the term of this patent is extended or adjusted under 35 U.S.C. 154(b) by 386 days.

(21) Appl. No.: 15/876,465

(22) Filed: Jan. 22, 2018

(65) Prior Publication Data

US 2019/0230749 A1 Jul. 25, 2019

(51) Int. Cl.
*H05B 6/68* (2006.01)
*H05B 6/70* (2006.01)
(Continued)

(52) U.S. Cl.
CPC ........... *H05B 6/686* (2013.01); *H05B 6/6467* (2013.01); *H05B 6/705* (2013.01); *H05B 6/708* (2013.01); *H05B 6/745* (2013.01)

(58) Field of Classification Search
CPC ...... H05B 6/6467; H05B 6/686; H05B 6/705; H05B 6/708
(Continued)

(56) References Cited

U.S. PATENT DOCUMENTS 2,762,972 A 9/1956 Henning
4,211,911 A 7/1980 Dehn
(Continued)

FOREIGN PATENT DOCUMENTS

CN 2738257 11/2005
GB 742948 A 1/1956
(Continued)

OTHER PUBLICATIONS

International Search Report and Written Opinion dated Apr. 15, 2019 from International Application No. PCT/US2018/061083 filed Nov. 14, 2018, 21 pages.
(Continued)

*Primary Examiner* — Quang T Van
(74) *Attorney, Agent, or Firm* — Daylight Law, P.C.

(57) ABSTRACT

This disclosure includes methods and systems that utilize energy absorption monitoring for intelligent electronic ovens with energy steering. One disclosed method for heating an item in an electronic oven includes introducing an application of energy into a heating chamber using an energy source coupled to an injection port, changing a distribution of the application of energy in the heating chamber by setting a configuration of the oven to a first configuration, and measuring an energy return from the heating chamber while the oven is in the first configuration. The measuring is conducted using a radio frequency directional power sensor. The method also includes determining that the energy return from the heating chamber exceeds a level, adjusting, in response to determining that the energy return exceeds the level, the configuration of the oven from the first configuration to an altered first configuration, and saving the altered first configuration in a memory.

28 Claims, 6 Drawing Sheets

(51) Int. Cl.

| | |
|---|---|
| ***G01N 22/00*** | (2006.01) |
| ***H05B 6/74*** | (2006.01) |
| ***H05B 6/64*** | (2006.01) |

(58) Field of Classification Search

USPC ....... 219/696, 746, 702, 721, 771, 778, 705, 219/709, 711; 324/632–639; 426/27; 422/22, 105, 108, 168, 177

See application file for complete search history.

(56) References Cited

U.S. PATENT DOCUMENTS

| | | | | |
|---|---|---|---|---|
| 2010/0176123 | A1* | 7/2010 | Mihara | H05B 6/686 219/746 |
| 2011/0290789 | A1 | 12/2011 | Matsuzawa | |
| 2015/0070029 | A1* | 3/2015 | Libman | G01N 22/00 324/637 |
| 2017/0257914 | A1 | 9/2017 | Nikishov et al. | |

FOREIGN PATENT DOCUMENTS

| | | | |
|---|---|---|---|
| GB | 2023313 | B | 1/1983 |
| JP | 5549632 | B2 | 7/2014 |
| PL | 208044 | B1 | 6/2005 |
| WO | 1999004275 | A1 | 1/1999 |
| WO | 2013021285 | A1 | 2/2013 |
| WO | 2017172539 | A1 | 10/2017 |

OTHER PUBLICATIONS

International Preliminary Report on Patentability and Written Opinion dated Aug. 6, 2020 from International Application No. PCT/US2018/061083 filed Nov. 14, 2018, 14 pages.

Invitation to Pay Additional Fees dated Feb. 22, 2019 from International Application No. PCT/US2018/061083 filed Nov. 14, 2018, 15 pages.

* cited by examiner

200
Apply Energy
201
Set Config.
210
Measure Return
220
Adjust Config.
230
Save Altered Config.
240
203
202
205
203
202
205
207
221
208
203
202
205
241

600

610

ENERGY ABSORPTION MONITORING FOR AN INTELLIGENT ELECTRONIC OVEN WITH ENERGY STEERING

BACKGROUND

The energy source of an electronic oven delivers an application of energy to a heating chamber in the form of strong electromagnetic fields. A certain amount of that application of energy is reflected to the energy source, and a certain amount is absorbed in the chamber. In an ideal heating chamber, the energy absorbed in the chamber is all delivered to an item that has been placed in the chamber for heating. However, even with an ideal chamber, the level of energy absorbed in the chamber may be less than the amount of energy applied to the chamber based on the characteristics of the item in the electronic oven and the application of energy to the chamber. In an extreme case, the user of an electronic oven may forget to place an item in the chamber, and nearly all the energy applied to the chamber will be reflected to the source.

In certain electronic ovens, such as typical microwave ovens, the electromagnetic fields take the form of waves. Waves within an electronic oven that are not absorbed by the heated item reflect within the chamber and cause standing waves. Standing waves are caused by the constructive and destructive interference of waves that are coherent but traveling in different directions. The combined effect of the reflected waves is the creation of local regions of high and low microwave field intensity, or antinodes and nodes. The waves may interfere destructively at the nodes to create spots where little or no energy is available for heating. The waves interfere constructively at the antinodes to create spots where peak energy is available. The resulting pattern of field intensity can be referred to as the distribution of the application of energy in the chamber.

In the case of typical microwave ovens, the electromagnetic fields are a result of microwave radiation from a magnetron, and the waves within the electronic oven exhibit a frequency of either 2.45 GHz or 915 MHz. The wavelengths of these forms of radiation are 12 cm and 32.8 cm respectively. While heating, the electromagnetic waves in the chamber of a magnetron-powered microwave oven may drift or hop in frequency for short periods of time, generally within a range of +/−5%. For purposes of this disclosure, the mean temporal wavelength of an electromagnetic wave is referred to as the "dominant wavelength" of the associated electromagnetic wave, and dimensions of an electronic oven that are given with respect to a frequency or wavelength of an electromagnetic wave refer to the frequency or wavelength of the dominant wavelength of that electromagnetic wave.

SUMMARY

The distribution of an application of energy to a heating chamber in an electronic oven can be steered by a control system of the electronic oven to more evenly heat an item in the electronic oven. Energy can be steered in an electronic oven by placing the oven in different configurations to cause different distributions of energy to be produced within the heating chamber. Transitioning between these various configurations results in the effective steering of energy in the chamber. As the configuration of the electronic oven transitions from a first configuration to a second configuration, a first antinode or "hot spot" of the distribution could be moved across the item. Therefore, transitioning between these two configurations will assure that the same hot spot does not remain in the same location on the item for too long.

The configuration of the electronic oven can be defined by the physical positioning of a set of variable reflectance elements in the electronic oven. For example, an electronic oven with a set of variable reflectance elements for controlling the distribution of heat in an electronic oven is disclosed in U.S. patent application Ser. No. 15/619,390 filed on Jun. 9, 2017, which is hereby incorporated by reference for all purposes. However, the configurations of the electronic oven do not necessarily require the electronic oven itself to take on different physical configurations. In some approaches, the configuration of the electronic oven can be changed to alter the distribution of energy in the electronic oven without the electronic oven utilizing any moving parts. For example, the variable reflectance elements and energy source of the electronic oven could each solely comprise solid state devices, and the configuration of the oven could be set by providing different signals to those solid-state devices.

The systems and methods disclosed in the approaches mentioned above, and the field of electronic heating with intelligent control systems and steerable energy generally, can benefit from the ability to monitor the amount of energy absorbed by the item in the electronic oven and to apply that information to the control system of the electronic oven. The control system can involve a machine intelligence system and can include a deterministic planner or a reinforcement learning system. Electronic ovens with control systems that utilize evaluative feedback or deterministic planning to evenly heat an item in an electronic oven are disclosed in U.S. patent application Ser. No. 15/467,975 filed on Mar. 23, 2017, which is hereby incorporated by reference for all purposes. Electronic ovens with deterministic planners are particularly attuned to receive the benefits of some of the approaches disclosed herein. However, controls systems that utilize any form of evaluative feedback can benefit from the use of information regarding the absorption of energy by an item placed in the heating chamber.

This disclosure includes methods and systems that utilize energy absorption monitoring for an intelligent electronic oven with energy steering. The electronic oven can include a directional power sensor to determine how much energy is being delivered to an item in the electronic oven. This determination can be made on an ordinal basis relative to the amount of power delivered, or on a cardinal basis depending upon the configuration of the oven and the sensor. The information gleaned from the directional power sensor can be used by the control system to tweak the way the electronic oven delivers energy. For example, in a discovery phase for a machine learning system, samples in which the energy absorbed did not cross a desired level in response to a given configuration of the electronic oven could result in that configuration being discarded and avoided in later training, exploration, or plan generation steps conducted by the control system. As another example, in the execution phase for a deterministic planner, the control system could tweak the way energy was being steered to increase the energy absorbed by the item while still executing the plan. In this situation, a tweaked configuration corresponding to the original configuration could then be used in place of the original method without the need to generate a new plan.

For example, a disclosed method for heating an item in an electronic oven comprises introducing an application of energy into a heating chamber using an energy source coupled to an injection port, changing a distribution of the application of energy in the heating chamber by setting a configuration of the oven to a first configuration, and measuring an energy return from the heating chamber while the oven is in the first configuration. The measuring is conducted using a radio frequency directional power sensor. The method also comprises determining that the energy return from the heating chamber exceeds a level, adjusting, in response to determining that the energy return exceeds the level, the configuration of the oven from the first configuration to an altered first configuration, and saving the altered first configuration in a memory.

As another example, an electronic oven comprises a heating chamber, an energy source coupled to an injection port in the heating chamber for introducing an application of energy into the heating chamber, a control system to change a distribution of the application of energy in the heating chamber by altering a configuration of the electronic oven, and a radio frequency (RF) directional power sensor that senses an energy return from the heating chamber. The control system adjusts the configuration of the electronic oven from a first configuration to an altered configuration based on the energy return from the heating chamber. The electronic oven also comprises a memory. The control system stores the altered configuration in the memory.

DETAILED DESCRIPTION

This disclosure includes methods and systems that utilize energy absorption monitoring for intelligent electronic ovens with energy steering. The electronic oven can include a radio frequency (RF) directional power sensor that senses an amount of power being either delivered to or reflected from the chamber. The directional power sensor can be a directional power coupler coupled to the waveguide of the electronic oven. The information obtained by the waveguide can be used by the control system of the electronic oven to thereby improve the oven's performance. In a specific set of examples, the oven can be placed in a number of configurations to affect an application of energy in the chamber of the electronic oven. Each configuration creates a different resulting distribution of that application of energy in the chamber of the electronic oven. The information obtained by the directional power sensor can be used to determine which configurations are worth using from the perspective of efficient delivery of energy to the item in the chamber. Furthermore, in some approaches, the relationship of configurations to energy distribution can be nonlinear and small modifications to a given energy distribution may have a significant impact on how much energy is absorbed by the item. Therefore, the information from the directional power sensor can be used to conduct slight tweaks to a given configuration to increase its efficacy.

Figure 1:
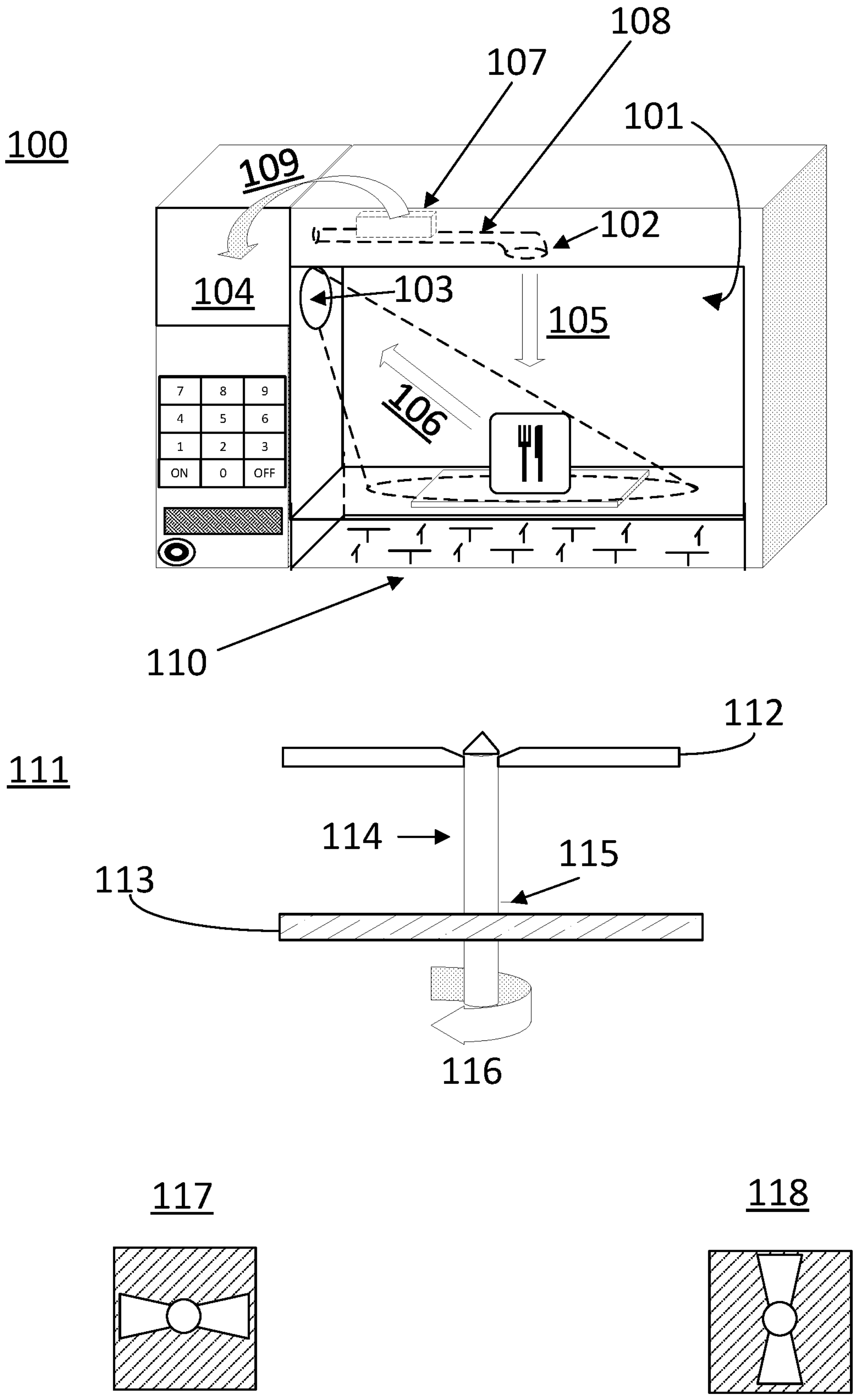
FIG. 1 illustrates an example of an intelligent electronic oven with energy steering in accordance with some of the approaches disclosed herein.

FIG. 1 illustrates an example of an intelligent electronic oven with energy steering in the form of electronic oven 100. The features of electronic oven 100 are for explanatory purposes only, and the approaches disclosed herein are more broadly applicable to any electronic oven with any form of energy steering. Additionally, electronic oven 100 utilizes a directional coupler 107 coupled to waveguide 108 as the directional power sensor of the electronic oven, but any number of directional power sensors could be used in its place. Additionally, since precise measurement of the forward and reverse power is not required for some of the approaches disclosed herein, an approximate measurement may be provided by monitoring the waveguide voltage standing wave ration (VSWR), or peak field amplitude at one or more points along the waveguide could be used instead. In electronic oven 100, directional coupler 107 provides information 109 to control system 104 regarding how much energy the item in chamber 101 is absorbing. Information 109 can be used in various methods to improve the performance of the electronic oven as described below.

In electronic ovens in accordance with the methods described below, energy is steered in the chamber by placing the electronic oven in different configurations. Transitions between configurations can occur without the physical configuration of the electronic oven changing. However, in electronic oven 100, control system 104 sets the configuration of the oven by adjusting the physical configuration of a set of reflective elements 110 that are located below a false floor of the electronic oven. Control system 104 can monitor the condition of the item using information 106 obtained by a sensor 103. Control system 104 can control the heating process by manipulating reflective elements 110 and receiving information 106 in the absence of information 109. However, the performance of the electronic oven can be improved by using information 109 to determine which configurations can be discarded, and to slightly alter the configurations to increase their efficacy. In certain approaches, the control loop associated with information 109 can be considered to be in parallel with the control loop associated with information 106. The control loop associated with information 106 can include an overarching machine intelligence system for the electronic oven. The overarching machine intelligence system can include a deterministic planner instantiated by control system 104.

Electronic oven 100 in FIG. 1 illustrates various features of an electronic oven that can be used in accordance with approaches disclosed herein. The oven opening is not illustrated to reveal chamber 101 in which the item is placed to be heated. The item is bombarded by electromagnetic waves via a distribution of an application of energy 105 from an energy source. Electronic oven 100 includes a control system 104. The control system 104 can include a processor, ASIC, or other embedded system core, and can be located on a printed circuit board or other substrate. The control system can also have access to firmware or a nonvolatile memory such as flash or ROM to store instructions for executing the methods described herein.

The energy source for electronic oven 100 can be a source of electromagnetic energy. The source could include a single wave-guide or antenna. The source could include an array of antennas. The electromagnetic waves can be microwaves. The electronic oven 100 can include a cavity magnetron that produces microwaves from direct current power. The microwaves could have a frequency of 2.45 GHz or 915 MHz. The cavity magnetron can be powered by modern inverter microwave technology such that microwaves can be produced at varying power levels. However, traditional power conditioning technology can be used to produce a set level of direct current power for the magnetron. The electromagnetic waves could be RF waves generally. The frequency of the waves could also be alterable by the energy source. The energy source could also be configured to produce multiple wave patterns with different frequencies simultaneously.

Electronic oven 100 can also include a discontinuity in the walls of chamber 101 that is configured to allow electromagnetic radiation to channel out of the chamber. The discontinuity could be an opening used by sensor 103. The opening could comprise a past cutoff waveguide with physical parameters set to block the electromagnetic energy from the energy source while allowing electromagnetic energy in other spectrums to escape. For example, microwave energy could be prevented from exiting the opening while visible light and infrared energy passed through the opening.

Sensor 103 could be configured to detect infrared energy or visible light, or a combination of the two. The sensor or set of sensors could include an IR camera, a visible light camera, a thermopile, or any other sensor capable of obtaining visible light sensor data and/or infrared light sensor data. In a specific example, the opening could be connected to a standard visible light camera with an IR filter removed in order for the camera to act as both a visible light sensor and an infrared sensor and receive both infrared sensor data and visible light sensor data. A single sensor approach would provide certain benefits in that an error in the alignment of two different fields of view would not need to be cancelled out as could be the case with a two-sensor system. Various other sensors could be used including auditory sensors, particulate sensors, humidity sensors, temperature sensors, and others. The sensors, such as sensor 103, can be used by control system 104 to observe a response of an item in the heating chamber to an application of energy while the electronic oven is in a given configuration. The response could be monitored during a discovery phase of a machine intelligence system, during the execution of a plan, or during any process that required evaluative feedback.

The configurations of the electronic oven can be set in numerous ways and do not have to involve moving parts. Numerous approaches for altering the configurations of an electronic oven are disclosed in U.S. patent application Ser. No. 15/619,390 filed on Jun. 9, 2017. However, the following specific example from electronic oven 100 is provided for purposes of explaining various aspects of this disclosure. The set of variable reflectance elements 110 are located below a false floor in electronic oven 100. The set of variable reflectance elements exceeds three elements. Control system 104 stores individual position values for each of the elements in the set of variable reflectance elements 110 such that it can directly relate a given configuration of the electronic oven to information 106 regarding the response of the item to an application of heat with that given configuration applied. In the same manner, control system 104 can directly relate a given configuration of the electronic oven to information 109 regarding the energy reflected from the chamber with that given configuration applied. Furthermore, the control system can independently alter a physical position of each reflective element in the set of variable reflectance elements. The configurations, or commands that cause the electronic oven to be placed in those configurations, can be stored in memory in the electronic oven. For example, the individual position values can be stored in memory so that a current configuration of the electronic oven can be recalled at a later time.

A single element 111 of the variable reflectance elements 110 is shown at the bottom of FIG. 1. Single element 111 alters a distribution of energy in the chamber by altering its physical position from a first position to a second position. The element includes a reflective element 112 which in this case is a relatively flat piece of conductive material that could be formed of sheet metal such as aluminum, steel, or copper. The reflective element 112 is held above a surface of the chamber, defined by chamber wall 113, by a dielectric axle 114 that extends through a discontinuity 115 in the chamber wall. The axle is dielectric, passes through a small perforation, and is generally configured to avoid creating an antenna for microwave energy to leak out of the chamber. A motor on the exterior of the chamber rotates the reflective element 112 via dielectric axle 114 by imparting a force to the axle as illustrated by arrow 116. The force could be applied by a rotor attached to axle 114. The motor rotates the axle between a set of positions selected from a fixed set of positions. For example, the motor could adjust the axle so that the reflective element 112 was rotated back and forth through a 90° arc. A plan view of single element 111 is shown in a first position 117 and a second position 118 to illustrate such a 90° change in physical configuration.

Figure 2:
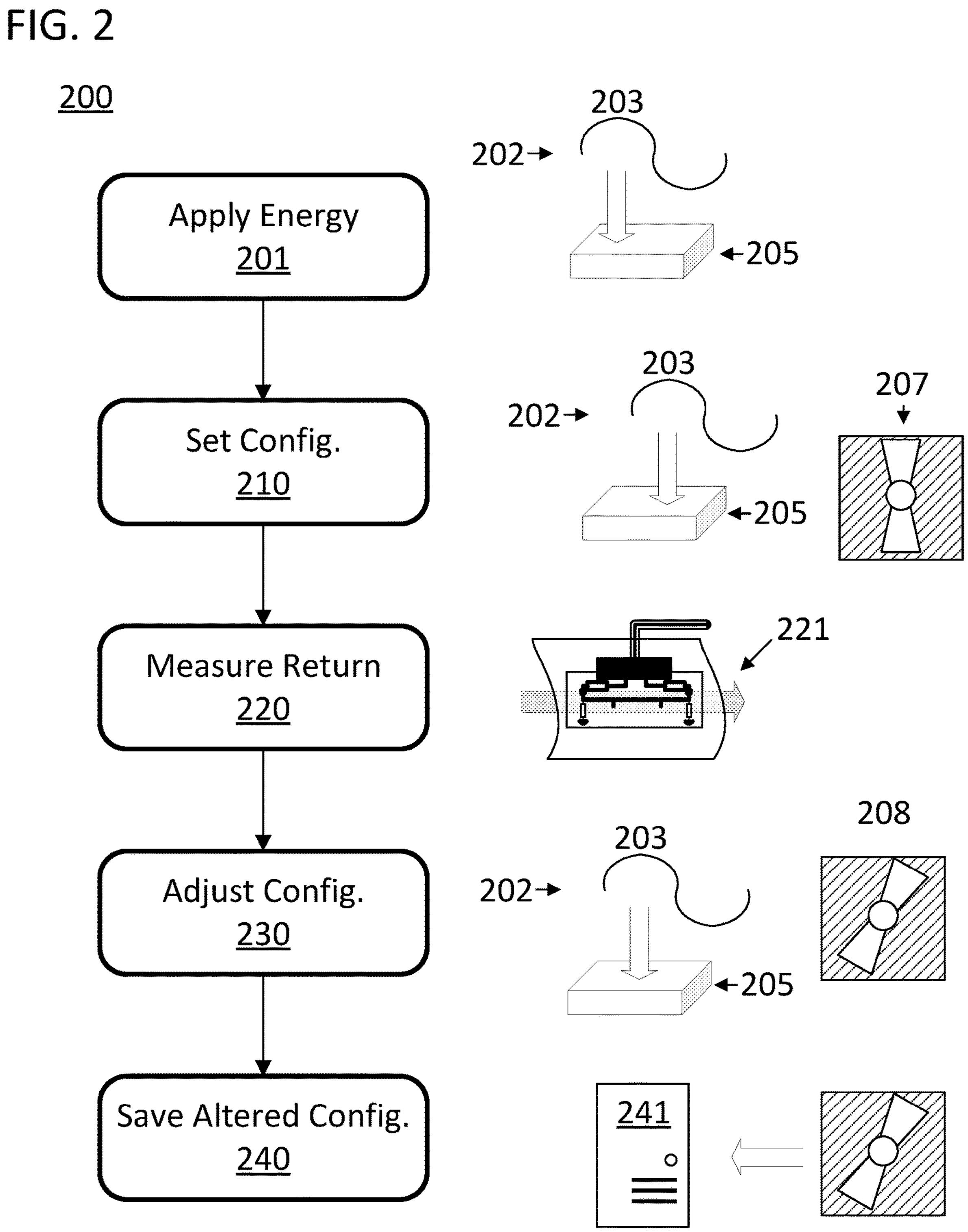
FIG. 2 illustrates a flow chart of a set of methods for using information regarding the energy return from a heating chamber of an electronic oven to improve the performance of the oven in accordance with some of the approaches disclosed herein.

FIG. 2 includes a flow chart 200 for a set of methods for using information regarding the energy return from the heating chamber while heating an item in an electronic oven with energy steering. Flow chart 200 begins with a step 201 of introducing an application of energy into a heating chamber of the electronic oven. The application of energy can be generated using an energy source coupled to an injection port in the heating chamber, such as injection port 102. The energy can be RF electromagnetic energy generally, and can more specifically be microwave energy. The configuration of the electronic oven can create a distribution of the application of energy in the heating chamber. In FIG. 2, a portion of the distribution is illustrated by waveform 202 which exhibits an antinode 203 at a specific location on item 205. The two dimensions of waveform 202 are the magnitude of the distribution and a physical location on item 205.

Flow chart 200 continues with a step 210 of changing the distribution of the application of energy in the heating chamber by setting a configuration of the electronic oven to a first configuration. Setting a configuration of the electronic oven to a first configuration can include setting a physical position of a reflective element in the heating chamber to a first physical position. The reflective element could be in a set of at least three reflective elements in the heating chamber. The set of at least three reflective elements could have the characteristics of the set of reflective elements 110 in FIG. 1. In the illustrated example, the first configuration of the electronic oven is a physical configuration illustrated by the position of reflective element 207. As illustrated, waveform 202 has shifted relative to item 205 such that antinode 203 is located at a different point on item 205. The configuration can be set by changing a current position value for a reflective element in a memory. The configuration of the electronic oven overall can be defined by a set of corresponding current position values for each of the reflective elements in the chamber. The value set for the position of reflective element 207 could be a corresponding current position value from that corresponding set of current position values. The position values can be persistently stored such that the control system of the electronic oven can keep track of the current configuration of the electronic oven both during and after the application of energy to the item and an analysis of the response of the item to that application of energy.

Flow chart 200 continues with a series of steps that utilize a directional power sensor to improve the performance of an electronic oven. Step 220 involves measuring an energy return from the heating chamber of the electronic oven while the electronic oven is in the first configuration. The measuring can be conducted using a directional power sensor. The directional power sensor can be an RF power coupler 221 such as the one described in FIG. 5. The RF directional power sensor can be a directional coupler connected to a waveguide of the electronic oven. The directional coupler could include a radio frequency sensing means connected to the exterior of a waveguide, and analog to digital converter to condition the measurement for delivery to a control system for the electronic oven. The energy return can be calculated by sampling a ratio of power returned to power delivered through the waveguide and combining that ratio with a known value for the total power generated by the energy source. For example, the control system of the microwave could be preprogrammed with the knowledge that the energy source delivers 1,000 Watts of power and the directional power sensor could return a ratio of 0.1 indicating that 100 Watts were being reflected back through the waveguide. The energy return would have a value of 0 in the ideal case of all power being absorbed in the oven and a value of 1 in the case of all power being reflected. The energy return is an example of information 109 from FIG. 1.

The control system of an electronic oven can utilize the information obtained in step 220 for various purposes. In particular, the control system can determine that the energy return from the heating chamber exceeds a level and take an action in response to that determination. The control system can compare the measured return against a threshold level and take an action regarding the current configuration of the electronic oven based on that comparison. The threshold level can be fixed or variable. For example, the control system can be designed to discard any configuration in which the energy return exceeds 0.4 in order to apply a static means for discarding configurations that are categorically considered inefficient. Alternatively, the threshold level can vary using information from other portions of the control system such that the delivery of energy to the item in an even manner is counterbalanced against overall absorption. For example, the threshold level could increase or decrease in direct proportion to how evenly energy was delivered to the item. Configurations resulting in a perfectly even distribution of energy to the item would be discarded if the energy return exceeded 0.5 while configurations with very uneven distributions of energy on the item would be discarded if energy return exceeded 0.05.

The action taken in response to a determination that the energy return is too high can vary based on the characteristics of the control system of the electronic oven. In general, a configuration can be discarded if the resulting return from the chamber is too high. Discarding a configuration can involve immediately altering the configuration of the electronic oven and taking no other action, flagging the configuration in memory as a configuration that should not be selected again, replacing the configuration in a library such that it is not drawn from the library again, searching for a new configuration with a lower energy return, deleting the configuration from memory, and any combination of those actions. For example, the measurement and determination in step 220 could be conducted during a discovery phase of a machine intelligence system in which potential configurations were being explored to limit the computational complexity of an associated planner by limiting the actions the planner should consider. In this case, the configuration would be discarded by flagging it as a configuration that should not be selected at a later time during discovery and by deleting the configuration from a memory so that it is not considered by the planner during the planning phase. More detailed examples of which type of action should be applied based on what machine intelligence system is utilized are provided below.

Discarding configurations can assist the operation of a machine intelligence system in various ways. The system that screens and discards configurations can execute in parallel with an overarching machine intelligence approach. For example, and with reference back to FIG. 1, an overarching machine intelligence system can utilize information 106 to adjust the configuration of the set of reflective elements 110, while a separate control loop considers information 109 for purposes of alleviating the burden of that machine intelligence system. As mentioned, the discarding of configuration can alleviate the computational complexity of a parallel machine intelligence system by limiting the number of configurations that need to be considered during a discovery phase. In a discovery phase, the configurations in step 210 may be generated or selected at random while a machine intelligence system attempts to learn which configurations are best for a given heat job. Therefore, using the information from a directional power sensor to screen out inefficient configurations can be beneficial to reduce the number of configurations the machine intelligence system must consider. This is particularly poignant in approaches in which the number of potential configurations is very large. Using electronic oven 100 as an example, with 14 reflective elements that can be placed into 2 different states, there are 16,384 potential configurations. Since the discovery phase of a machine intelligence process is not contributing to the completion of a given task, minimizing the time it takes greatly improves the performance of the system. Therefore, including a quick screen for a given configuration that depends on a simple up or down vote on the efficiency of the configuration can greatly improve the performance of the system. As another example, the discarding of a configuration in favor of a replacement configuration can alleviate the computational complexity of a parallel machine intelligence system that is executing a plan by maintaining the efficiency of the plan and avoiding the need to generate a replacement plan.

Flow chart 200 continues with a step 230 of altering a configuration of the electronic oven from a first configuration to an altered first configuration and a step 240 of saving the altered first configuration in memory. Step 230 is an example of an action that an electronic oven can take in response to determining that the energy return from the heating chamber exceeds a level. The level can be the threshold level discussed above. Adjusting the configuration of the electronic oven can be conducted by slightly tweaking the current configuration of the electronic oven. The adjustment can be a physical adjustment. For example, adjusting the configuration of the electronic oven from the first configuration to an altered configuration can include adjusting the physical position of a reflective element from a first physical position to an altered physical position. As illustrated, the position of reflective element 207 is altered by rotating the reflective element a few degrees to the altered first configuration 208. The adjustment can involve changing a corresponding current position value for the reflective element in memory.

In approaches in which a configuration is to be discarded by being replaced with a different and more efficient configuration, the adjustment made in step 230 can be conducted on a finer degree than the adjustments conducted in iterations of step 210. In certain approaches, setting the configuration of the electronic oven in step 210 is conducted by an overarching machine intelligence system while the adjustment of the configuration in step 230 is conducted by a parallel system that is designed to increase the efficiency of the machine intelligence system. Specifically, setting the configuration in step 210 could involve 90° steps while adjusting the configuration in step 230 could involve 5° steps. As illustrated, the adjustment will slightly modify the position of antinode 203, and will thereby have the potential to affect the amount of energy absorbed by the item in the chamber. Specifically, modifying the physical application of heat to the item in the chamber will affect the amount of energy absorbed by the item instead of being reflected to the energy source. The adjustments and measurements in steps 220 and 230 could be conducted iteratively to decrease the energy return below a target level. The altered configuration can then be saved in a memory 241 as in step 240. The configuration can be saved in memory in the form of specific current position values or a position value with a pointer to an offset from that position value.

Figure 3:
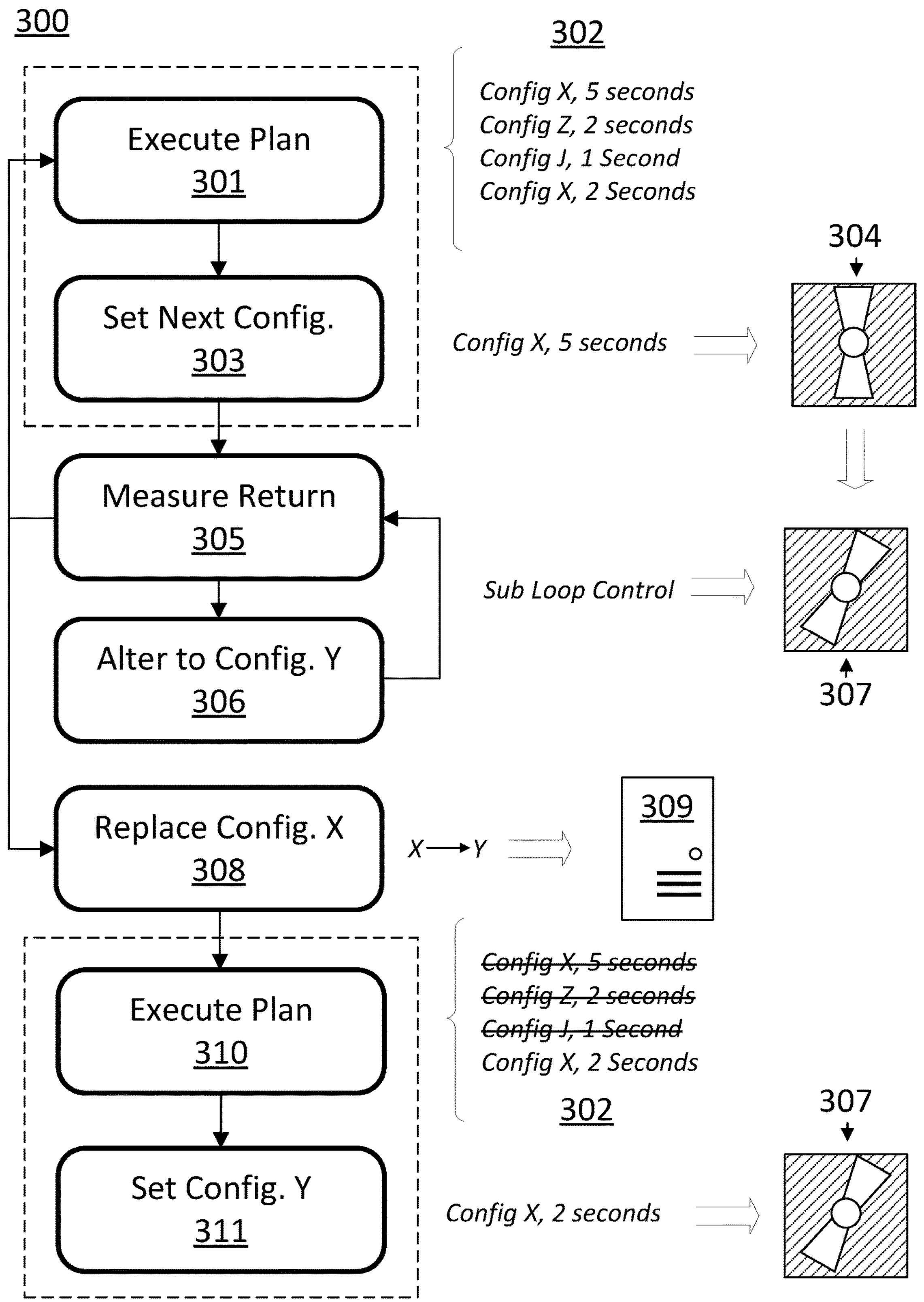
FIG. 3 illustrates a flow chart of a set of methods for using information regarding the energy return from a heating chamber during a plan execution phase of a machine intelligence system with a deterministic planner in accordance with some of the approaches disclosed herein.

FIG. 3 includes a flow chart 300 for a set of methods for increasing the efficiency of an intelligent electronic oven with energy steering using a directional power sensor. In the set of methods described by flow chart 300, the electronic oven is an intelligent electronic with a control system that includes a machine intelligence system with a deterministic planner. The control system also includes a secondary control system that can execute in parallel with the machine intelligence system and modify plans generated by the deterministic planner. The secondary control system augments the overarching machine intelligence system by tweaking the plan as it executes, to maintain the fidelity of the plan to initial expectations regarding the efficiency of the plan.

Flow chart 300 begins with a step 301 of executing a plan to heat an item in the heating chamber. As such, flow chart 300 assumes that the plan has already been generated, and can be preceded by a discovery phase. In some approaches, the discovery phase will include putting the electronic oven into various configurations and observing the response of the item to that configuration. The observations can then be used to generate the plan for heating the item. In the illustrated case, plan 302 includes a sequence of configurations of the electronic oven. The illustrated plan also includes a duration for which each of the configurations should be held. If the planner behaves as expected, the plan will result in an evenly heated item in which the distribution of energy in the chambers has been adjusted appropriately to achieve even heating.

Flow chart 300 continues with a step 303 of setting the configuration of the electronic oven to a next configuration. The next configuration can be the next configuration in the plan. As illustrated, the next configuration can be configuration "X" and the execution of step 303 can be conducted as part of the execution of step 301. Step 303 can exhibit the features of step 210 described above, including the configuration being a physical configuration for the electronic oven. As illustrated, configuration X is defined by the physical position of a reflective element in a physical configuration 304.

At each step in the plan, the energy return of the electronic oven can be measured to determine if the plan needs to be modified from its original form. Flow chart 300 continues with steps 305 and 306 which can be conducted iteratively, and represent the operation of the secondary control system mentioned above. Step 305 involves measuring the energy return from the heating chamber while the electronic oven is in configuration X. Step 306 involves altering the configuration from configuration X to configuration Y. Step 305 can be conducted in accordance with step 220 described above. However, step 305 can also involve comparing an energy return for a given configuration during execution of the plan against a prior measurement for the energy return when that given configuration was applied. In other words, the threshold used to determine if the energy return is too low can be variable and assigned to the energy return value measured when configuration X was analyzed during a discovery phase of the machine intelligence system. The variable threshold can also be the previously measured return value with a tolerance to allow for slight variations such as +0.1. If it is determined that the energy return has increased above a desired value, the flow chart can proceed to step 306 whereby the current configuration is discarded by being replaced with an altered configuration. If the energy return is acceptable, the flow chart can return to step 301 in which the next configuration is applied and the plan can continue to execute. Step 306 can be conducted in accordance with step 230 mentioned above and can involve tweaking the configuration with a finer degree of resolution than is available to the machine intelligence system that conducts an initial discovery on potential configurations. As illustrated, the adjustment can be a physical adjustment to the position of a reflective element in the electronic oven to an altered configuration 307.

If the configuration is altered in step 306, the flow chart can proceed to step 308, in which an original configuration is replaced in memory by a new configuration. The execution of step 308 can involve saving the new configuration in memory in accordance with step 240 above. The new configuration can be the altered configuration found via the execution of step 306, which can be referred to as configuration "Y." The old configuration can be the configuration that was determined to have an unacceptably high return value in the first execution of step 305. As illustrated, configuration Y can replace configuration X in memory 309. This can be done be changing the position values stored in association with configuration X. Because of this replacement, if configuration X is called for again by the plan, the electronic oven will be placed into configuration Y. This is illustrated by the execution of steps 310 and 311 which represent the overarching machine intelligence system continuing to operate after configuration Y has replaced configuration X in memory. As a result, when it is time to return to configuration X in plan 302, the control system will instead execute a step 311 of setting the electronic oven in configuration Y illustrated by altered configuration 307. As a result, the fidelity and efficiency of the plan can be maintained through execution of the entire plan without needing to modify or regenerate a new plan.

Figure 4:
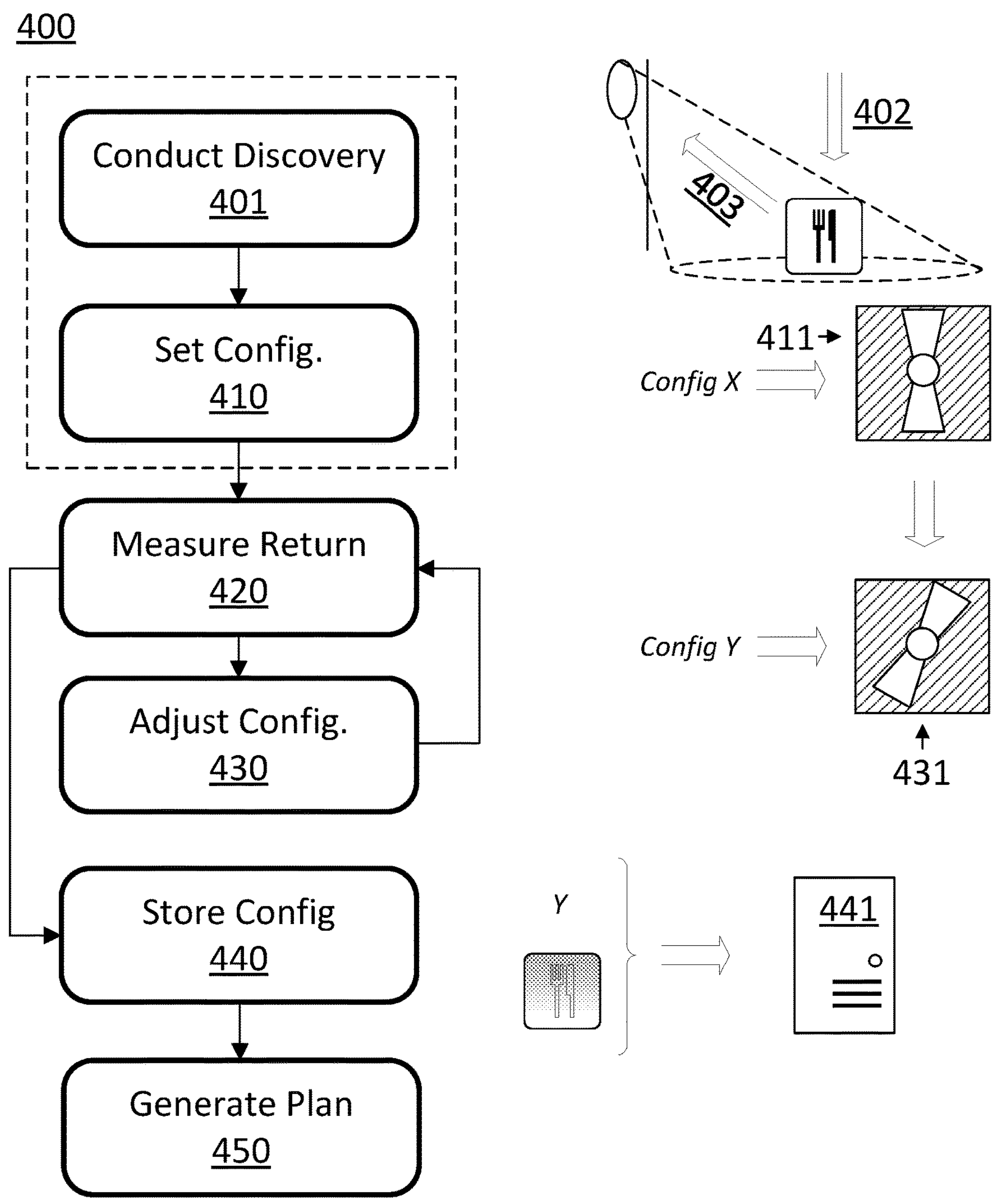
FIG. 4 illustrates a flow chart of a set of methods for using information regarding the energy return from a heating chamber of an electronic oven during a discovery phase of a machine intelligence system in accordance with some of the approaches disclosed herein.

FIG. 4 includes a flow chart 400 for a set of methods for increasing the efficiency of an electronic oven using a directional power sensor. Flow chart 400 includes a step 401 of conducting a discovery on an item in a heating chamber. The discovery can include the execution of step 410 in which the electronic oven is placed in a configuration in order to produce a distribution of energy in the heating chamber. The discovery can also include observing a response of the item to that distribution of energy. The purpose of the discovery can be to store the response of an item 403 to an application of energy 402 for purposes of either identifying the item or for obtaining data points for generating a plan for heating the item. As illustrated, the configuration can be defined by a physical configuration of a set of reflective elements in the chamber such as physical configuration 411.

Steps 401 and 410 can be conducted by a machine intelligence system that instantiates a deterministic planner. The data obtained through the execution of step 401 can be used to generate a plan for heating the item in the electronic oven. In addition, a secondary control system can conduct steps 420 and 430 to alleviate the computational complexity of the machine intelligence system that conducts step 401. Step 420 can involve measuring the energy return while the electronic oven is in the configuration applied in step 410. Additionally step 420 can be conducted by the control system while observing the response of the item to the application of energy for purposes of conducting discovery. With reference to the illustrated example, the energy return can be measured at the same time as response 403 is being monitored for purposes of obtaining data points for the deterministic planner. After conducting step 420, the flow chart can continue to step 430 or step 440. The path taken can depend on a determination as to whether the measured energy return is below a sufficient level. For example, the energy return can be compared against a threshold. The step can be conducted in accordance with step 220 above. For example, the threshold could be a fixed value such as 0.4 so that any configuration with an energy return exceeding 0.4 would be discarded, and step 430 would be conducted to replace the configuration. In the same example, if the energy return was below 0.4, the flow chart would proceed to step 440. Step 430 can be conducted iteratively and can generally be conducted in accordance with steps 306 and 230 mentioned above. Particularly, the degree of adjustment available for altering the configuration of the electronic oven in step 430 can have a finer resolution than the process that governs the execution of step 410. As illustrated, the adjustment to the configuration can result in an altered physical configuration for a reflective element in the electronic oven such as altered physical configuration 431.

Regardless of whether flow chart 400 flows through step 430, step 440 will involve storing a configuration of the electronic oven in memory. The configuration is stored in association with a response of the item. The associated response and configuration will be stored in a library along with other responses of the item and according configurations. If the first configuration set in step 410 produced an acceptable level of energy return, the first configuration and a first response of the item thereto will be stored in step 440. If the first configuration did not produce an acceptable level of energy return, the altered configuration produced in step 430 and a second response of the item thereto will be stored in step 440. This process, as having included the execution of step 430, is illustrated by configuration “Y” being stored in combination with a response of the item in the chamber in memory system 441.

A library of responses and configurations can be used by a deterministic planner to generate an efficient plan for evenly heating the item when a plan is generated in step 450. The operation of steps 420 and 430 act as an initial screen to prevent inefficient configurations from being stored in the library. This alleviates the burden on the machine intelligence system because as the number of potential configurations increases the number of potential plans increases exponentially. Therefore, limiting the number of potential configurations serves to simplify the process of plan generation. Furthermore, since the only configurations available to the planner are configurations with high efficiency, any plan produced by the deterministic planner will likewise be an efficient plan.

The iterative process of measuring the energy return and adjusting the configuration of the electronic oven can be conducted in numerous ways. In certain approaches, this process will be conducted by a secondary control system that executes along with an overarching and independent machine intelligence system. In certain approaches, and as mentioned above, the granularity of the adjusting process will be finer than the granularity of the independent machine intelligence system. This can be beneficial where the machine intelligence system needs to rapidly explore and discover configurations with widely differing responses. The relative ratio of granularity can be on the order of 0.1. For example, in the case of variant physical configurations defined by the rotation of a reflective element around a 360° range, the overarching machine intelligence system could have a granularity of 90° while the adjusting process has a granularity of 9°.

The iterations can be conducted and repeated in accordance with various procedures and search algorithms. The iterations can be halted after a set period of time, a set number of iterations, or upon reaching a target level for the energy return. The steps themselves can follow a predetermined schedule, be guided by a gradient descent system, or be guided by any known optimization or search algorithm. The gradient descent system or optimization algorithm can be designed to evaluate and minimize the energy return. The adjustments can be step-wise, in which measurements were taken after each step in series, or the adjustments can involve a smooth sweep with continuous measurements taken in real time with the sweep. In a specific approach, iterations are halted after a set period of time or set number of iterations, measurement values for each potential altered configuration are stored in a set of potential altered configurations, and the altered configuration is selected from a set of potential altered configurations based on the stored measurements. The steps in each iteration in such an approach can be random or follow a fixed schedule. This approach, and others like it, can be paired with the option to repeat another round of iterations if the current round did not generate a potential configuration that places the energy return below a desired threshold level. In another specific approach, the iterations can be step-wise adjustments guided by a gradient descent evaluation of the energy return from the heating chamber and the altered configuration can be selected as the currently evaluated configuration as soon as it is determined that the currently evaluated configuration produces an energy return that is below a desired threshold level.

As mentioned previously, a specific implementation of the directional power sensor that can be used in combination with the methods described above is a directional power coupler that is coupled to a waveguide of the electronic oven. The waveguide can couple the energy source of the electronic oven to the heating chamber of the electronic oven. Therefore, a directional power coupler connected to the waveguide can provide information concerning the energy return of the electronic oven at any given time. An example of a directional power coupler can be described with reference to FIGS. 5-6. The dimensions and materials of the illustrated power coupler can be selected such that the directional power coupler is an RF directional power coupler attuned to detect energy flow in the microwave range.

Figure 5:
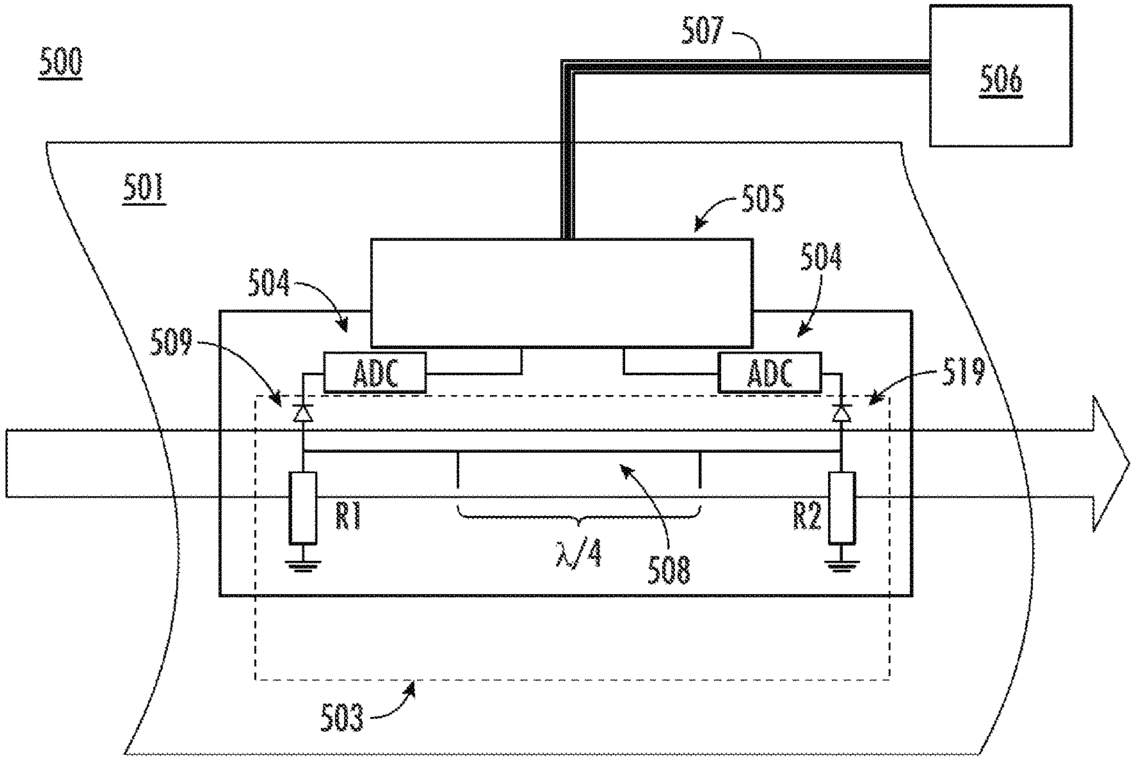
FIG. 5 illustrates a simplified block diagram and a photograph of a directional power coupler formed on a printed circuit board (PCB) that can be used in accordance with some of the approaches disclosed herein.
Figure 5:
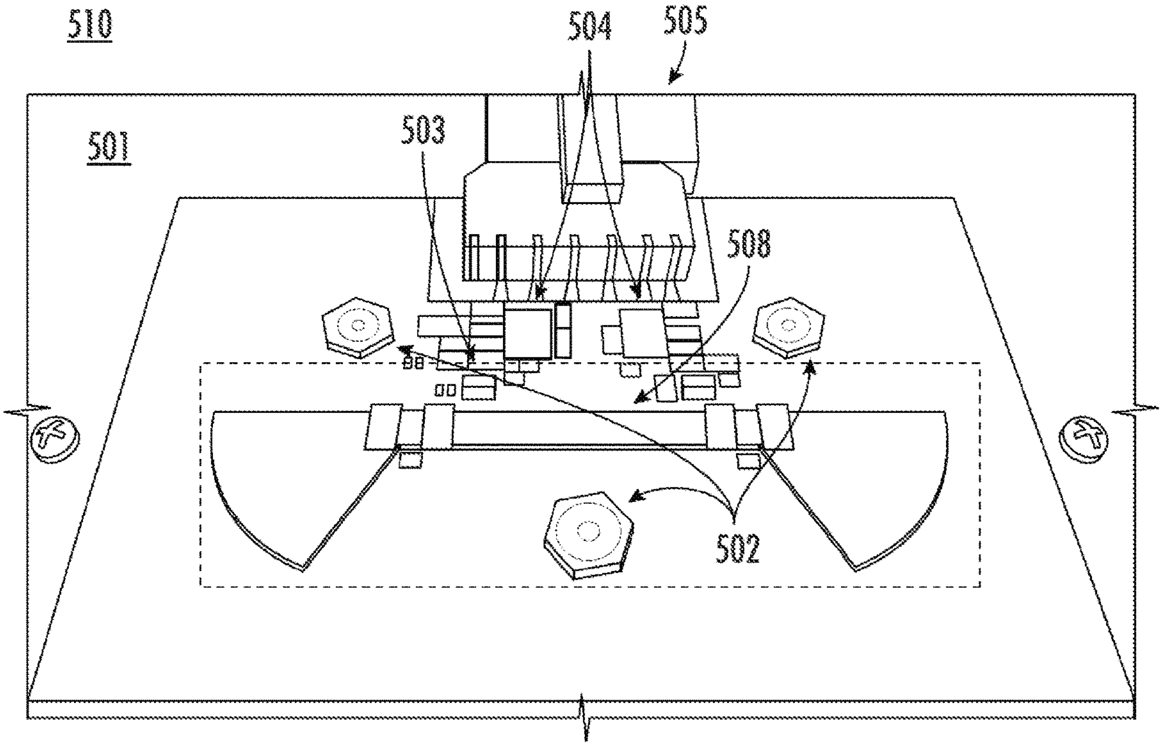

FIG. 5 includes a conceptual block diagram 500 and a photograph 510 of an example of a directional power coupler that can be used in accordance with the methods and systems disclosed herein. The directional power coupler is formed on a printed circuit board (PCB) and is attached to an exterior surface of a waveguide 501. The PCB is attached to the waveguide using three screw and nut assemblies 502, but the directional power coupler can be attached to the waveguide using other means such as a layer of adhesive or tape. The directional power coupler can include a radio frequency sensing means, such as radio frequency sensing means 503, at least one analog to digital converter (ADC), such as ADCs 504, and a control system connection 505 for routing information to a control system 506 using a bus 507. As will be described below, the radio frequency sensing means obtains a measurement of the amount of energy flowing in either direction through the waveguide. This information is translated by the ADCs 504 into digital information that is used by the control systems described above. This illustrated directional power coupler can be directional power sensor 107 on waveguide 108 and provide information 109 to control system 104.

Figure 6:
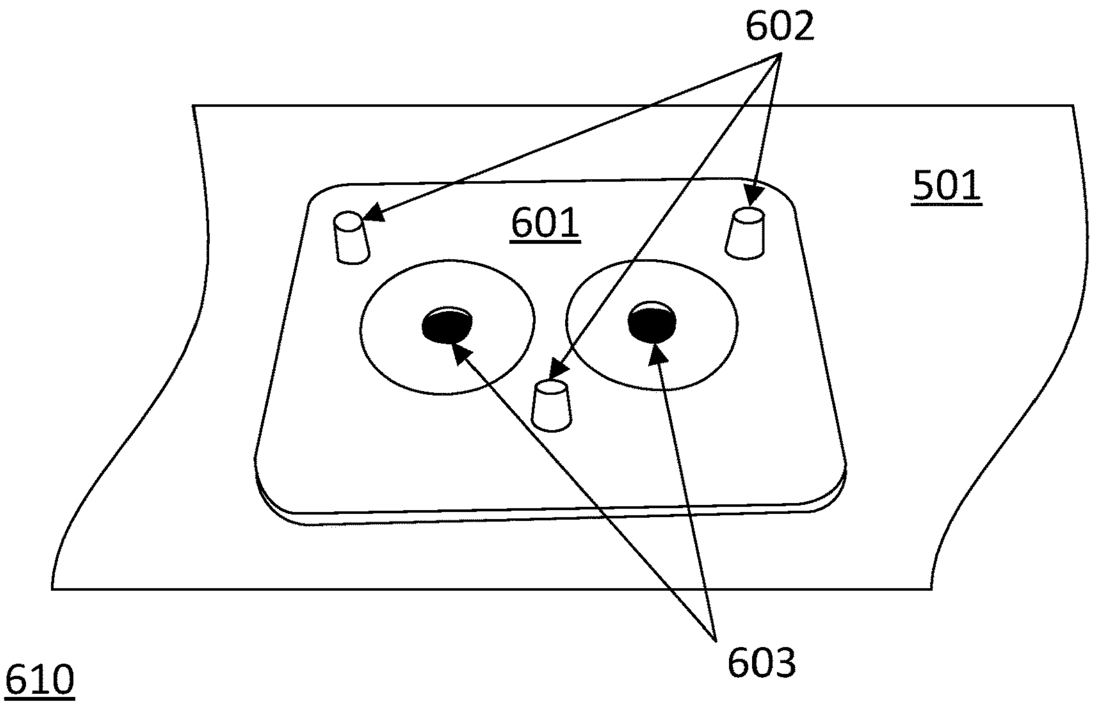
FIG. 6 illustrates two views of a mounting plate configured to pair with the PCB of FIG. 5 in accordance with some of the approaches disclosed herein.
Figure 6:
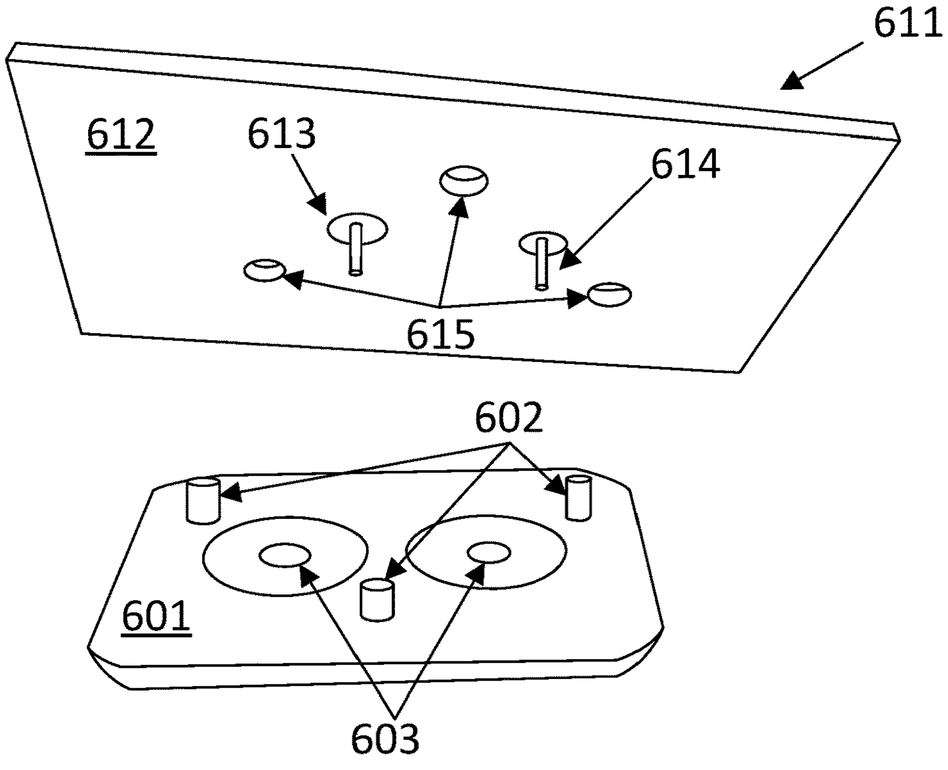

FIG. 6 provides two views of a process for adhering the directional power coupler of FIG. 5 onto a waveguide 501. View 600 shows a mounting plate that has been welded or otherwise adhered to an exterior surface of the waveguide 501. The mounting plate includes two holes spaced apart in such a way that they can be aligned with two perforations 603 in the wave guide. The perforations will be used to channel out a radio frequency signal from the waveguide as described below. The mounting plate additionally includes three bolts 602 for attaching to the PCB, or other substrate, that holds the directional power coupler. As seen in view 610, PCB 611, which can be the PCB seen in photograph 510, is designed to align with mounting plate 601. As a result, the bottom surface of the PCB 612 will be in contact with or face the exterior surface of the waveguide 501 when the PCB is attached.

PCB 611 is configured to allow pins from the PCB to extend through the perforations 603 in the exterior surface of the waveguide when the PCB is secured to mounting plate 601. A first pin 613 and a second pin 614 will extend from a bottom surface of the PCB through the first and second perforations 603. Pins 613 and 614 extend through the substrate of the PCB and provide an electrical connection to a conductive line 508 formed on the top surface of the PCB. Mounting holes 615 are designed to align with the bolts 602 to allow PCB 611 to be secured to mounting plate 601. Once the bolt screw assemblies are fastened, the bottom surface of PCB 611 will face, and may be in contact with, an exterior surface of the waveguide. The pins used to outcouple energy from the waveguide can be referred to as probe pins and can be designed to extend a few millimeters into the waveguide.

Using a directional power coupler in accordance with the approaches illustrated by FIGS. 5-6, measuring the energy return can include outcoupling energy from waveguide 501 via the first and second perforations 603 to a conductive line. The outcoupled energy is delivered to conductive line 508 that is formed on the top surface of the PCB and that connects the first pin 613 and second pin 614. The measuring can also include measuring a first voltage across a first detector diode 509 and a second voltage across a second detector diode 519. The first detector diode could be located proximate the first perforation and the second detector diode could be located proximate the second perforation. Each detector diode could have an anode coupled to ground via a termination resistor, as illustrated. The first and second pins could be spaced apart along the waveguide by a distance equal to one quarter the dominant wavelength of the electromagnetic wave the electronic oven's energy source applies to the chamber. With this spacing, the first voltage and the second voltage will, due to constructive and destructive interference of electromagnetic waves, each be caused by energy flowing in only one direction in the waveguide.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a non-transitory computer-readable medium storing instructions for those method steps. The computer-readable medium may be a memory within the electronic oven or a network accessible memory. Although examples in the disclosure included heating items through the application of electromagnetic energy, any other form of heating could be used in combination or in the alternative. The term "item" should not be limited to a single homogenous element and should be interpreted to include any collection of matter that is to be heated. Although examples in the disclosure where generally directed to electronic ovens, the same approaches could be utilized in any application in which a machine intelligence system is in the feedback loop of a system that applies electromagnetic energy to affect an item located in a volume subject to that electromagnetic energy. These and other modifications and variations to the present invention may be practiced by those skilled in the art, without departing from the scope of the present invention, which is more particularly set forth in the appended claims.

What is claimed is:

1. A method for heating an item in an electronic oven comprising:

introducing an application of energy into a heating chamber of the electronic oven using an energy source coupled to an injection port in the heating chamber;

changing a distribution of the application of energy in the heating chamber by setting a configuration of the electronic oven to a first configuration;

measuring an energy return from the heating chamber while the electronic oven is in the first configuration, wherein the measuring is conducted using a radio frequency (RF) directional power sensor;

determining that the energy return from the heating chamber exceeds a level;

adjusting, in response to determining that the energy return exceeds the level, the configuration of the electronic oven from the first configuration to an altered first configuration; and saving the altered first configuration in a memory;

wherein the energy source is coupled to the injection port in the heating chamber via a waveguide; and wherein measuring the energy return from the heating chamber comprises:

outcoupling energy from the waveguide via a first perforation and a second perforation in the waveguide;

measuring a first voltage across a first detector diode located proximate the first perforation; and measuring a second voltage across a second detector diode located proximate the second perforation.

2. The method of claim 1, wherein:

setting the configuration of the electronic oven includes setting a physical position of a reflective element in the heating chamber to a first physical position;

adjusting the configuration of the electronic oven from the first configuration to the altered first configuration includes adjusting the physical position of the reflective element from the first physical position to an altered first physical position; and the reflective element is in a set of at least three reflective elements in the heating chamber.

3. The method of claim 2, further comprising:

storing a corresponding current position value, from a corresponding set of current position values, independently for each reflective element in the set of at least three reflective elements;

wherein adjusting the physical position of the reflective element in the heating chamber to the altered first physical position includes changing the corresponding current position value for the reflective element.

4. The method of claim 1, further comprising:

executing a plan to heat the item in the heating chamber, wherein the plan includes a sequence of configurations of the electronic oven, and wherein the first configuration is in the sequence of configurations of the electronic oven;

wherein the step of changing the distribution of the application of energy in the heating chamber by setting the configuration of the electronic oven to the first configuration is conducted during the execution of the plan.

5. The method of claim 4, further comprising:

changing the distribution of the application of energy in the heating chamber by setting the configuration of the electronic oven to the altered first configuration;

wherein the step of changing the distribution of the application of energy in the heating chamber by setting the configuration of the electronic oven to the altered first configuration is conducted during the execution of the plan; and wherein saving the altered first configuration in memory includes replacing the first configuration in the memory.

6. The method of claim 1, further comprising:

conducting a discovery on the item in the heating chamber;

wherein the discovery includes observing a response of the item to the application of energy while the configuration of the electronic oven is in the first configuration;

wherein the observing of the response is conducted during the step of measuring the energy return from the heating chamber; and wherein the step of saving the altered first configuration in the memory includes associating the altered first configuration with a second response of the item to the application of energy.

7. The method of claim 6, further comprising:

generating a plan to heat the item in the heating chamber using the second response of the item;

wherein the plan includes a sequence of configurations of the electronic oven; and wherein the altered first configuration is in the sequence of configurations of the electronic oven.

8. The method of claim 1, wherein:

the energy source applies an electromagnetic wave to the heating chamber;

the electromagnetic wave has a dominant wavelength; and the first and second perforation are spaced apart along the waveguide by a distance equal to one quarter the dominant wavelength.

9. The method of claim 1, wherein:

the first and second detector diodes are connected by a conductive line formed on a printed circuit board;

a first pin extends from a bottom surface of the printed circuit board through the first perforation;

a second pin extends from the bottom surface of the printed circuit board through the second perforation;

the first and second pins are connected by the conductive line; and the bottom surface of the printed circuit board faces an exterior surface of the waveguide.

10. The method of claim 1, wherein adjusting the first configuration to the altered first configuration comprises:

conducting a step-wise adjustment of the configuration of the electronic oven; and measuring the energy return from the heating chamber after each step in the step-wise adjustment.

11. The method of claim 10, further comprising:

selecting the altered first configuration from a set of potential altered first configurations based on the measuring of the energy return after each step.

12. The method of claim 10, further comprising:

determining, after a step in the step-wise adjustment, that the energy return from the heating chamber has returned below the level; and selecting the altered first configuration upon determining that the energy return from the heating chamber has returned below the level.

13. The method of claim 10, wherein:

the step-wise adjustment is guided by a gradient descent evaluation of the energy return from the heating chamber.

14. The method of claim 1, wherein adjusting the first configuration to the altered first configuration comprises:

conducting a sweep of the configuration of the electronic oven; and measuring the energy return from the heating chamber continuously during the sweep.

15. The method of claim 14, further comprising:

determining, during the sweep of the configuration of the electronic oven, that the energy return from the heating chamber has returned below the level; and selecting the altered first configuration upon determining that the energy return from the heating chamber has returned below the level.

16. An electronic oven comprising:

a heating chamber;

an energy source coupled to an injection port in the heating chamber for introducing an application of energy into the heating chamber;

a control system to change a distribution of the application of energy in the heating chamber by setting a configuration of the electronic oven to a first configuration;

a radio frequency (RF) directional power sensor that measures an energy return from the heating chamber while the electronic oven is in the first configuration, wherein the control system adjusts the configuration of the electronic oven from the first configuration to an altered first configuration in response to determining that the energy return from the heating chamber exceeds a level;

a memory, wherein the control system stores the altered first configuration in the memory; and a waveguide that couples the energy source to the injection port;

wherein the RF directional power sensor measures the energy return from the heating chamber by:

outcoupling energy from the waveguide via a first perforation and a second perforation in the waveguide;

measuring a first voltage across a first detector diode located proximate the first perforation; and measuring a second voltage across a second detector diode located proximate the second perforation.

17. The electronic oven of claim 16, further comprising:

a set of at least three reflective elements in the heating chamber;

wherein the control system alters the configuration of the electronic oven by independently altering a physical position of each reflective element in the set of at least three reflective elements.

18. The electronic oven of claim 17, wherein:

the memory stores a corresponding current position value, from a set of current position values, independently for each reflective element in the set of at least three reflective elements; and the control system alters the physical position of the set of at least three reflective elements by changing the corresponding current position value for the reflective element.

19. The electronic oven of claim 16, further comprising:

a deterministic planner instantiated in the control system;

wherein the deterministic planner generates a plan to heat an item in the heating chamber;

wherein the plan includes a sequence of configurations and the first configuration is in the sequence of configurations; and wherein the control system stores the altered first configuration in memory: (i) by replacing the first configuration in the memory; and (ii) during execution of the plan.

20. The electronic oven of claim 16, further comprising:

a sensor to observe a response of an item in the heating chamber to the application of energy while the electronic oven is in the first configuration;

wherein the control system uses the sensor while conducting a discovery on the item; and wherein the control system alters the configuration of the electronic oven from the first configuration to the altered first configuration: (i) based on the energy return from the heating chamber; and (ii) while conducting the discovery.

21. The electronic oven of claim 16, wherein:

the energy source applies an electromagnetic wave to the heating chamber;

the electromagnetic wave has a dominant wavelength; and the first and second perforation are spaced apart along the waveguide by a distance equal to one quarter the dominant wavelength.

22. The electronic oven of claim 16, further comprising:

a printed circuit board with a bottom surface facing an exterior surface of the waveguide;

a first pin extending from the bottom surface of the printed circuit board through the first perforation;

a second pin extending from the bottom surface of the printed circuit board through the second perforation; and a conductive line: (i) formed on the printed circuit board; (ii) connecting the first and second detector diodes; and (iii) connecting the first and second pins.

23. The electronic oven of claim 16, wherein the control system:

adjusts the first configuration to the altered first configuration by conducting a step-wise adjustment of the configuration of the electronic oven; and measures the energy return from the heating chamber after each step in the step-wise adjustment.

24. The electronic oven of claim 23, wherein the control system:

selects the altered first configuration from a set of potential altered first configurations based on the measuring of the energy return after each step.

25. A non-transitory computer-readable medium storing instructions to execute a method comprising:

introducing an application of energy into a heating chamber of an electronic oven using an energy source coupled to an injection port in the heating chamber;

changing a distribution of the application of energy in the heating chamber by setting a configuration of the electronic oven to a first configuration;

measuring an energy return from the heating chamber while the electronic oven is in the first configuration, wherein the measuring is conducted using a radio frequency (RF) directional power sensor;

determining that the energy return from the heating chamber exceeds a level;

adjusting, in response to determining that the energy return exceeds the level, the configuration of the electronic oven from the first configuration to an altered first configuration; and saving the altered first configuration in a memory;

wherein the energy source is coupled to the injection port in the heating chamber via a waveguide; and wherein measuring the energy return from the heating chamber comprises:

outcoupling energy from the waveguide via a first perforation and a second perforation in the waveguide;

measuring a first voltage across a first detector diode located proximate the first perforation; and measuring a second voltage across a second detector diode located proximate the second perforation.

26. The computer-readable medium of claim 25, wherein:

setting the configuration of the electronic oven includes setting a physical position of a reflective element in the heating chamber to a first physical position;

adjusting the configuration of the electronic oven from the first configuration to the altered first configuration includes adjusting the physical position of the reflective element from the first physical position to an altered first physical position; and the reflective element is in a set of at least three reflective elements in the heating chamber.

27. The computer-readable medium of claim 26, wherein the method further comprises:

storing a corresponding current position value, from a corresponding set of current position values, independently for each reflective element in the set of at least three reflective elements;

wherein adjusting the physical position of the reflective element in the heating chamber to a first physical position includes changing the corresponding current position value for the reflective element.

28. The computer-readable medium of claim 26, wherein the method further comprises:

executing a plan to heat an item in the heating chamber, wherein the plan includes a sequence of configurations of the electronic oven, and wherein the first configuration is in the sequence of configurations of the electronic oven;

changing the distribution of the application of energy in the heating chamber by setting the configuration of the electronic oven to the altered first configuration;

wherein the step of changing the distribution of the application of energy in the heating chamber by setting the configuration of the electronic oven to the first configuration is conducted during the execution of the plan;

wherein the step of changing the distribution of the application of energy in the heating chamber by setting the configuration of the electronic oven to the altered first configuration is conducted during the execution of the plan; and wherein saving the altered first configuration in memory includes replacing the first configuration in the memory.

* * * * *